Nov. 16, 1971    R. D. BEALE    3,620,022
THRUST REVERSER FOR JET PROPULSION ENGINES
Filed Oct. 7, 1969    2 Sheets-Sheet 1

Inventor
Richard D. Beale
By
Cushman, Darby & Cushman
Attorneys

Nov. 16, 1971  R. D. BEALE  3,620,022
THRUST REVERSER FOR JET PROPULSION ENGINES
Filed Oct. 7, 1969  2 Sheets-Sheet 2
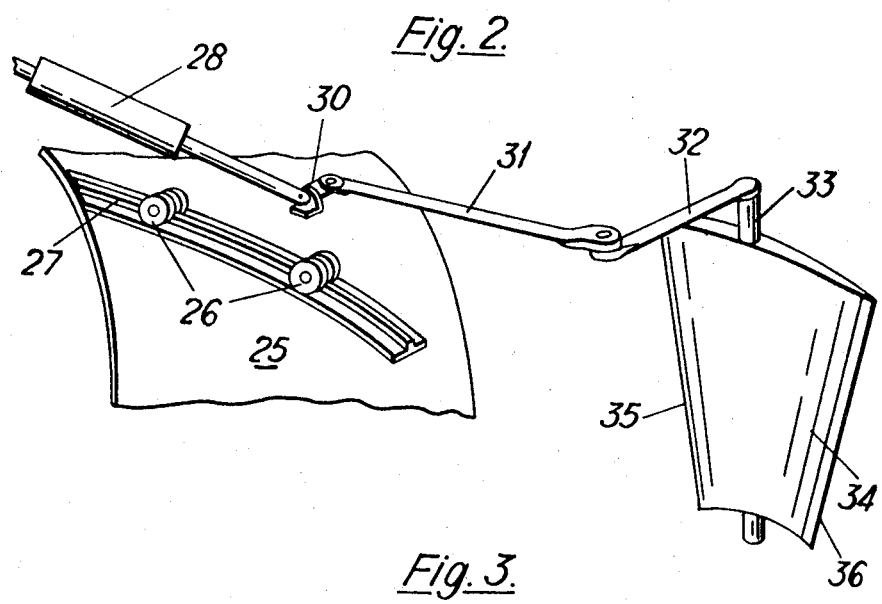
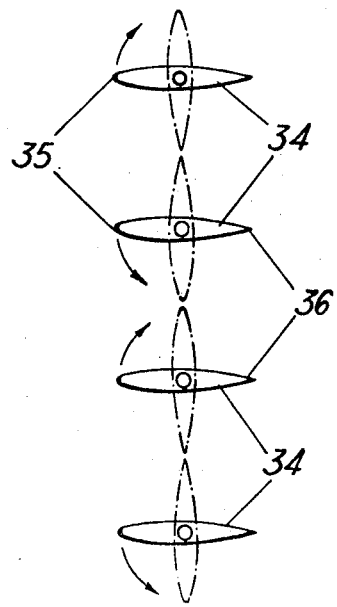
Inventor
Richard D. Beale
By
Cushman, Darby & Cushman
Attorneys

United States Patent Office 3,620,022
Patented Nov. 16, 1971

3,620,022
THRUST REVERSER FOR JET PROPULSION ENGINES
Richard D. Beale, Derby, England, assignor to Rolls-Royce Limited, Derby, England
Filed Oct. 7, 1969, Ser. No. 864,473
Claims priority, application Great Britain, Oct. 24, 1968, 50,568/68
Int. Cl. F02k *1/20, 3/04*
U.S. Cl. 60—226 A      6 Claims

ABSTRACT OF THE DISCLOSURE

A fan thrust reverser for a jet engine has an annular deflecting gap in the outer wall of the fan duct, and has pivotally mounted vanes at the downstream end of the duct, a ram being provided to cause a helically movable wall member to cover or uncover the gap while also causing the vanes to unblock or block the fan duct, respectively.

---

This invention relates to thrust reversers for jet propulsion engines and is an improvement in or modification of our British Pat. No. 1,116,190. In the preferred embodiment of said British Pat. No. 1,116,190, the fluid flow path (e.g. the fan duct), had to be specially shaped to suit the mode of action of the thrust reverser so that the wall member may itself close off the fluid flow duct in its operative position, but such special shaping may not always be possible, or it may be too expensive.

According to the present invention, there is provided a thrust reverser for a jet propulsion engine comprising an outer casing and an inner casing which define a fluid flow duct therebetween, at least one circumferentially extending opening in the outer casing, a wall member which is supported by the outer casing and which is movable between an inoperative position in which the entire fluid flow through said duct passes to the downstream end thereof and an operative position in which the or each said opening is uncovered and fluid flow is directed therethrough, the path of movement of the wall member being helical, obturating means mounted in said duct downstream of the or each said opening, said obturating means being movable between an inoperative position in which said obturating means causes minimum interference with said fluid flow in said duct and an operative position in which said obturating means blocks off the duct, and powered means for effecting corresponding movements of said wall member and said obturating means substantially synchronously.

Preferably, said obturating means includes a circumferential row of aerofoil-shaped vanes mounted for pivotal movement.

Each vane may be arranged to pivot about a radial axis passing through the mid-chord of each vane.

Advantageously, circumferentially adjacent vanes are arranged to pivot in opposite angular senses.

Said powered means is preferably common to said wall member and said obturating means which are connected by a link mechanism.

Preferably the said powered means comprises only one hydraulic or pneumatic ram.

The radially outer surface of said wall member may be provided with at least one rail member adapted to engage and co-operate with at least one roller secured to said outer casing.

The invention also includes a jet propulsion engine provided with at least one thrust reverser as set forth above.

The fluid flow duct may be a fan duct.

The invention is illustrated, merely by way of example, in the accompanying drawings, in which:

FIG. 2 is a perspective view of the broken-away part of the jet propulsion engine of FIG. 1, shown on an enlarged scale, and FIG. 3 is a diagrammatic developed view of the vanes forming part of the thrust reverser of this invention.

Figure 1:
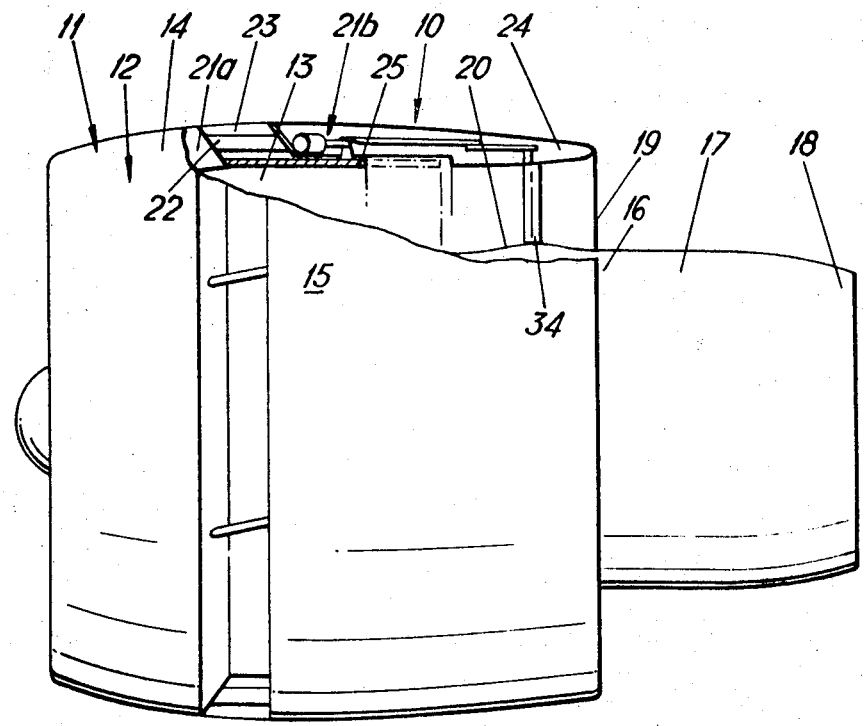
FIG. 1 is a diagrammatic side elevation, partially broken away, of a jet propulsion engine provided with a thrust reverser according to the present invention.

Referring to the drawings, there is shown a gas turbine jet propulsion engine 10 of the front fan type, comprising a large fan 11 from which air compressed thereby is passed into a main annular flow duct 12 and into a fan duct 13 surrounding the main flow duct 12. In the main duct 12 there are, in flow series, compressor means 14, combustion equipment 15, turbine means 16, exhaust duct 17 and a jet nozzle means 18. The fan duct 13 terminates in a nozzle 19. The fan duct 13 is separated from the main flow duct 12 by an inner casing 20.

The radially outer casing of the fan duct 13 is axially divided into two spaced apart portions 21a, 21b interconnected by a plurality of struts 22 which are of aerofoil cross section. Thus an annular circumferentially extending opening 23 is formed between the two portions of the outer casing 21.

The downstream portion 21b comprises a hollow fixed body 24 and a cylindrical wall member 25 which is movable relative to the fixed body 24.

The radially outer ends of the casing portions 21a, 21b constitute a part of a pod for the engine 10, while the radially inner surface of the fixed body 24 has a plurality of rollers 26 rotatably secured thereto, shown on FIG. 2 only, which figure omits the fixed body 24 for the sake of clarity. The rollers 26 engage and co-operate with rails 27 which are secured to the radially outer surface of the wall member 25.

The rails are mounted at an angle to the longitudinal axis of the engine 10, and in fact there is a plurality of such rails 27 angularly spaced apart around the periphery of the wall member 25.

As can be seen most clearly on FIG. 2, a pneumatic or hydraulic ram 28 is mounted in the fixed body 24 at an angle to the engine axis. The ram 28 is adapted, when actuated, to move the wall member 25 between its full line and dotted line positions (FIG. 1). The ram 28 is also connected by a link mechanism 30, 31, 32, 33 to a circumferential row of aerofoil-shaped vanes 34 located downstream of the opening 23. It will be noted that each vane 34 is pivotally mounted on a link member 33 which passes rotatably radially through said vane 34 substantially in the mid-chord position and is secured to the inner casing 20. It is to be understood that while for the sake of simplicity the link mechanism 30-33 has been drawn in FIG. 2 as if it actuated only one vane 34, the arrangement is in fact such that a single ram 28 actuates the entire row of vanes 34.

In the full line position, the wall member 25 merges smoothly into the fan duct 13 and constitutes the radially outer wall thereof. In this position, the wall member 25 substantially completely closes off the opening 23. At the same time, each vane 34 is arranged in an inoperative position for minimum interference with the fluid flow, i.e. with the respective leading edges 35 of the vanes 34 facing upstream. Thus in this position the flow of gases in the fan duct 13 is substantially undeflected, and the gases pass to atmosphere through the nozzle 19.

When it is desired to effect thrust reversal of the flow in the fan duct 13, the ram 28 is actuated to move the wall member 25 and the vanes 34 via the link mechanism 31-34 synchronously to their respective dotted line positions. It will be noted that in this position the vanes 34 substantially completely close off the fan duct 13; at the same time the wall member 25 uncovers the opening 23, through which the flow of gases is deflected outwardly. By shaping the sides of the opening 23 and the upstream edge of the wall member 25 with an upstream-facing inclination, the deflected gases are imparted a component of motion in that direction to effect thrust reversal.

It will be appreciated that, owing to the rails 27 being mounted at an angle to the engine axis on the periphery of the cylindrical wall member 25, the latter will describe a helical path in moving from its full line or inoperative to its dotted line or thrust reversing position.

It is well-known that in thrust reverser design the chief problem is to overcome the gas loads to which the blocking and deflecting parts of the thrust reverser are subjected in operation, bearing in mind that robustness of the mechanism causes undesirable weight increases. In the embodiment described so far, the vanes 34 are centrally pivoted and the gas loads are substantially balanced, so that, as a consequence, the necessary operating force for actuating the vanes 34 is low. In fact, it has been found that a single ram 28 of conventional capacity may be employed.

The arrangement of FIG. 3 shows a refinement for further reducing the gas loads encountered in operation. Here in the dotted line position (i.e. the thrust reversing position) the link mechanism is so arranged as to turn adjacent vanes 34 in opposite angular senses so as to bring the respective leading and trailing edges 35, 36 of the vanes next to each other. This arrangement substantially eliminates any torque being put on the structure. However, the invention results in considerable reduction of torque applied to the thrust reversing structure even if all the vanes 34 pivot in the same angular sense.

Although the engine 10 has been described as being a front fan engine, it will be readily understood that the invention is equally applicable to thrust reversal in any flow duct of any type of jet engine.

Moreover, while the invention has been described in terms of vanes as the obturating means, other kinds of flaps or even "clamshell doors" may be used instead of the vanes 34.

I claim:

1. A thrust reverser for a jet propulsion engine comprising: an outer casing and an inner casing defining an annular fluid flow duct therebetween, said outer casing having at least one circumferentially extending opening therethrough, a wall member supported by said outer casing and movable between an inoperative position in which the entire fluid flow through said duct passes to the downstream end thereof and an operative position in which said at least one opening is uncovered and fluid flow is directed therethrough, said wall member having a helical path of movement, a circumferential row of aerofoil-shaped vanes mounted in said duct downstream of said at least one opening and arranged to pivot about a radial axis passing through the mid-chord of each vane, said vanes being pivotable in opposite angular senses between an inoperative position in which said vanes cause minimum interference with said fluid flow in said duct and an operative position in which said vanes block off the duct, and powered means for effecting corresponding movements of said wall member and said vanes substantially synchronously.

2. A thrust reverser as claimed in claim 1 wherein said wall member has a radially outer surface provided with at least one rail member adapted to engage and cooperate with at least one roller secured to said outer casing.

3. A thrust reverser as claimed in claim 1 wherein said powered means is common to said wall member and said vanes which are connected by a link mechanism.

4. A thrust reverser as claimed in claim 3 wherein said powered means comprises only one fluid-pressure operated ram.

5. A fan-type jet propulsion engine comprising: an inner casing housing compressor means, combustion equipment and turbine means in flow series; an outer casing defining with said inner casing an annular fan duct; fan means in said fan duct; said outer casing having at least one circumferentially extending opening therethrough downstream of said fan means; a wall member supported by said outer casing and movable between an inoperative position in which the entire fluid flow through said fan duct passes to the downstream end thereof and an operative position in which said at least one opening is uncovered and fluid flow is directed therethrough, said wall member having a helical path of movement; a circumferential row of aerofoil-shaped vanes mounted in said fan duct downstream of said at least one opening and arranged to pivot about a radial axis passing through the mid-chord of each vane, said vanes being pivotable in opposite angular senses between an inoperative position in which said vanes cause minimum interference with fluid flow in said fan duct and an operative position in which said vanes block off said fan duct; and powered means for effecting corresponding movements of said wall member and said vanes substantially synchronously.

6. A fan-type jet propulsion engine as claimed in claim 5 in which said fan means is a front fan.

References Cited

UNITED STATES PATENTS

| 2,996,881 | 8/1961 | Gardiner | 239—265.31 |
| 3,344,604 | 10/1967 | Mattia | 60—226 |

FOREIGN PATENTS

| 1,116,190 | 6/1968 | Great Britain | 60—226 |

DOUGLAS HART, Primary Examiner

U.S. Cl. X.R.

60—229; 239—265.31